United States Patent
Bezuijen et al.

(10) Patent No.: US 7,219,095 B1
(45) Date of Patent: May 15, 2007

(54) INSTALLATION AND METHOD FOR UPDATING AN ADDRESS DATABASE WITH RECORDED ADDRESS RECORDS

(75) Inventors: Peter Christoffel Bezuijen, Amsterdam (NL); Dick Brandt, Leidschendam (NL); Erik Wilhelmus Gilles Van Westbroek, Nootdorp (NL); Marco Gerardus Van Der Veer, Renkum (NL); Frank Auke Nauta, Zoetermeer (NL); Helanus Elisabeth Rudolph Frings, Nootdorp (NL); Petrus Adrianua Bruijs, Gouda (NL)

(73) Assignee: PTT Post Holdings B.V., Ak Den Haag (NL)

( * ) Notice: Subject to any disclaimer, the term of this patent is extended or adjusted under 35 U.S.C. 154(b) by 520 days.

(21) Appl. No.: 10/019,941

(22) PCT Filed: Jul. 5, 2000

(86) PCT No.: PCT/NL00/00473

§ 371 (c)(1),
(2), (4) Date: May 8, 2002

(87) PCT Pub. No.: WO01/02104

PCT Pub. Date: Jan. 11, 2001

(30) Foreign Application Priority Data

Jul. 5, 1999 (NL) .................................. 1012519
Sep. 29, 1999 (NL) .................................. 1013177

(51) Int. Cl.
*G06F 17/30* (2006.01)

(52) U.S. Cl. ........................ 707/7; 707/104.1; 700/226

(58) Field of Classification Search ............... 707/6, 707/7, 10, 102, 104.1; 382/102, 209, 229; 700/226
See application file for complete search history.

(56) References Cited

U.S. PATENT DOCUMENTS

| | | | |
|---|---|---|---|
| 5,079,714 A | | 1/1992 | Manduley et al. |
| 5,422,821 A | * | 6/1995 | Allen et al. .................. 700/219 |
| 5,754,671 A | * | 5/1998 | Higgins et al. ............. 382/101 |
| 5,770,841 A | | 6/1998 | Moed et al. |
| 5,832,480 A | * | 11/1998 | Byrd et al. ..................... 707/5 |
| 6,088,796 A | * | 7/2000 | Cianfrocca et al. ......... 713/152 |
| 6,292,709 B1 | * | 9/2001 | Uhl et al. ................... 700/226 |
| 6,327,386 B1 | * | 12/2001 | Mao et al. ................... 382/186 |
| 6,508,365 B1 | * | 1/2003 | Cacace-Bailey et al. .... 209/584 |
| 6,647,385 B2 | * | 11/2003 | Seestrom et al. .............. 707/7 |

FOREIGN PATENT DOCUMENTS

EP 0 673 686 9/1995

* cited by examiner

*Primary Examiner*—Leslie Wong
(74) *Attorney, Agent, or Firm*—Young & Thompson

(57) ABSTRACT

Installation and method for updating an address database in a database memory (44) containing recorded address records, making use of the following steps: receiving and processing address data as shown on items of post; storing the address data; the determination of a quality rating for the address data on the basis of predefined criteria; comparison of the address data with the address records stored in the database memory (44); and updating the content of the database memory (44) on the basis of the quality rating and the comparison of the address data with the stored address records.

28 Claims, 4 Drawing Sheets

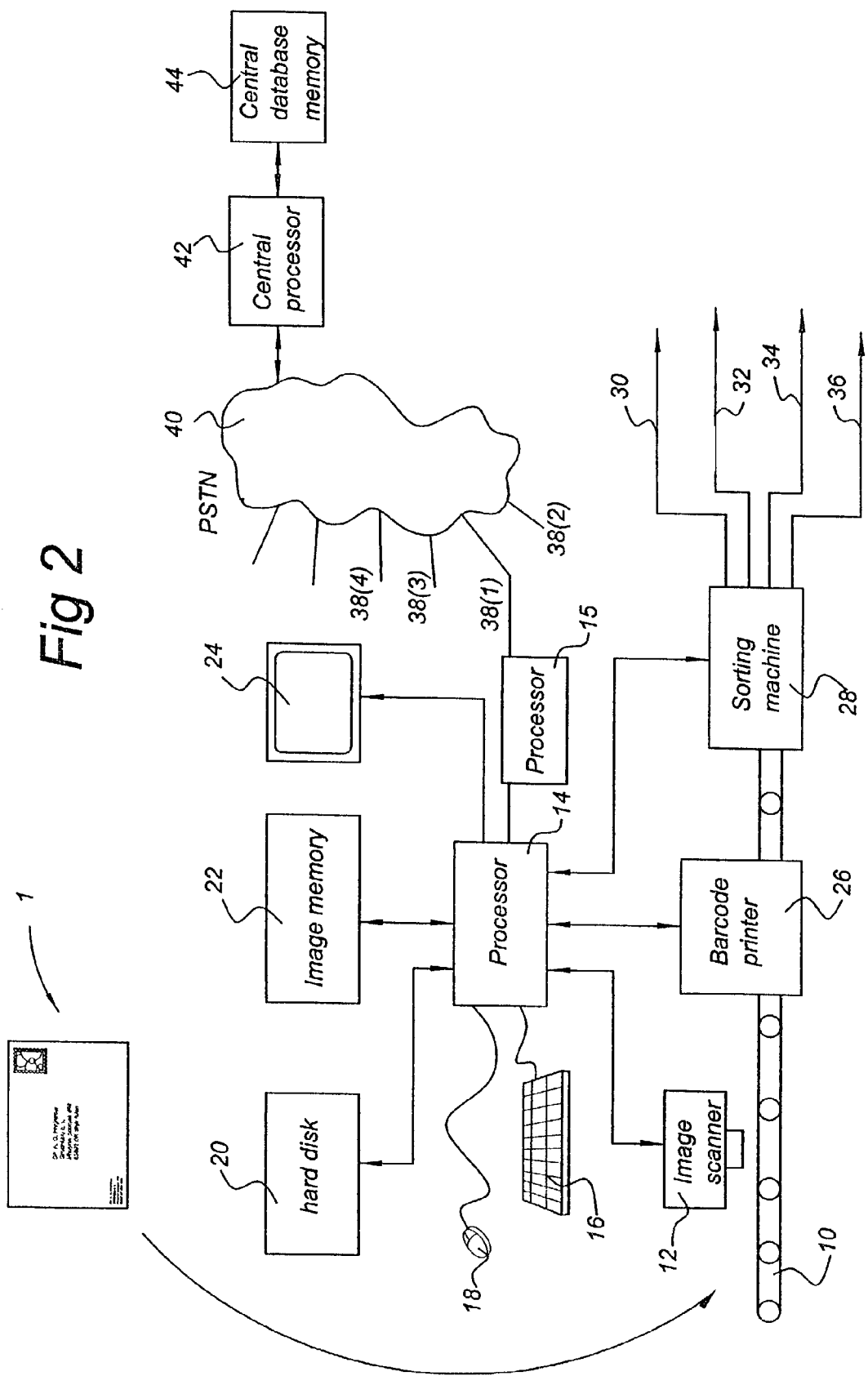

INSTALLATION AND METHOD FOR UPDATING AN ADDRESS DATABASE WITH RECORDED ADDRESS RECORDS

FIELD OF THE INVENTION

The present invention relates to an installation for updating an address database with recorded address records, comprising:

at least one processor for receiving and processing address data as shown on items of post;

a memory, connected to the at least one processor, for storing the address data;

a database memory, connected to the at least one processor, containing the address database stored therein.

An installation of this type is disclosed in JP-A 9/57204.

BACKGROUND OF THE INVENTION

JP-A 8/323299 relates to an address database management system that is equipped for updating an address database on the basis of returned post on which corrections have been made. The returned post is read by a reader and corrected data are stored in a memory. The management system automatically updates the database on the basis of the data given on the returned post A post sorting machine that is able to sort post in accordance with the corrected address is coupled to the database management system. This document does not relate to updating existing databases without making use of returned post on which corrections have been made.

JP-A 9/314067 describes a post sorting device and method. A set-up is shown which comprises means for reading address information from the post and generating an address code on the basis of this address information. As an alternative the address information can be entered manually. The address code is compared with the content of an address information database. If the address code does not precisely correspond to an address in the database, the address code and possible correct addresses are displayed to the operator. The operator is then able, for example by comparing the name of the addressee on the post with the names of the addressees in the possible correct addresses, to decide which of the latter is correct. This correct address is then printed on the item of post for further automated sorting. This document works on the assumption that the address database is correct.

JP-A 9/75862 describes a post sorting machine. This comprises a video coding terminal. The machine operator enters a user's code. The machine evaluates the correctness of the user's code by comparison with a database. This document does not mention updating an address database.

JP-A 9/57204, from which the present claims are delimited, relates to the problem of updating an address database that is used in an automatic post sorting installation.

In such a post sorting installation there is a video coding unit which reads items of post and converts the address data into an address code, for example using an optical character recognition unit. The address code is stored in a memory. During the sorting process the address code is compared with address data stored in an address database. If the comparison shows that the address code corresponds to an address stored in the database, this is then accepted as correct for further sorting.

Some address codes do not correspond to any address in the database. It is then possible to display the image of the item of post recorded by the video coding unit on a screen. The operator of the post sorting installation then studies the information entered on the screen and inputs by hand, for example via a keyboard, the address that has to be used for the subsequent sorting process. However, the said JP-A 9/57204 also proposes updating of the database itself so that errors and/or cases where address codes do not correspond to an address in the database will occur increasingly less frequently.

To this end, JP-A 9/57204 in essence proposes the following: the address codes of the items of post which do not correspond to an address in the database are stored in a memory. The associated rejected items of post are removed via a separate line. At a suitable point in time the rejected items of post are fed into the machine again in order to update the database on the basis of renewed reading. In principle, there can be two different causes for the rejection of the items of post. Firstly, the optical character recognition system may not have recognised one or more characters. Secondly, it can be that all characters have been recognised but that the address code thus established does not correspond to an address in the database.

In the first case the image recorded by the video coding unit is displayed to the system operator. On the basis of this image the operator decides how the incorrect characters have to be corrected. The database is optionally corrected or supplemented via pattern recognition of the address thus corrected by hand. In the second case the database is supplemented with the new address information, which is assumed to be correct.

The problem that is solved by the present invention relates to updating an address database as automatically as possible. Problems which arise with such an operation are, for example, as follows: the address database will always contain some address data for which the reliability can be improved or which contain small errors. Furthermore, many people are frequently at a temporary address which is not their home address, for example when they are on holiday or if they have been admitted to hospital for some time. During that period the post for them is sent to an address other than their home address. Nevertheless the address on the post for them is correct and sorting should not be refused. Equally, an address database should not be modified in such a case. Moreover, many people move without informing the postal delivery services of their new home address in time or in the correct manner. In this case modification of the address database is required. Many people also receive post addressed to different addresses, for example because they have a home address and a business address. Finally, the postal delivery services are not aware of any address at all for some people (for example children), whilst that would be useful for monitoring the sorting process.

OBJECT OF THE INVENTION

The aim of the application is first of all to avoid these types of problems as far as possible when updating the address database and to obtain data which are as reliable as possible.

SUMMARY OF THE INVENTION

To this end the installation of the type mentioned in the preamble is characterised in that the at least one processor is equipped to determine a quality rating for the address data on the basis of predefined criteria, to compare the address data with the address records stored in the database memory and to update the content of the database memory on the basis of the quality rating and the comparison of the address data with the stored address records.

In the installation of the invention an address database containing recorded address records is thus continually updated on the basis of address data printed on items of post and received by the installation. For this operation these data shown on items of post can optionally be read by people, who then enter these data by hand. Preferably, however, reading of these address data takes place automatically. Automatic reading can be carried out using any technology known for this purpose. Updating of the address database takes place completely automatically and is not, as in the prior art, based on manual improvement of the address database on the basis of items of post for which the address data read do not correspond to stored address records and which have been rejected by the installation. To this end the installation according to the invention makes use of a quality rating which indicates how good the address data are and which is determined on the basis of predefined criteria. The installation determines completely automatically whether the quality is such that the address database can be updated on the basis of the address data.

When updating the address database use can be made of address data read automatically for all items of post. Of course, it is, however, also possible to use a selection of these. For example, consideration can be given to random samples or the avoidance of updating the address database during a specific period in which a great deal of post is submitted for unusable addresses, for example the Christmas period. It is also possible, for example, not to process handwritten address data or to disregard address data on postcards.

The present invention also relates to a method for updating an address database in a database memory containing recorded address records, comprising:

receiving and processing address data as shown on items of post;
storing the address data;

characterised by the determination of a quality rating for the address data on the basis of predefined criteria, comparison of the address data with the address records stored in the database memory and updating the content of the database memory on the basis of the quality rating and the comparison of the address data with the stored address records.

The present invention also relates to a data carrier provided with a computer program that can be read by a computer installation and, after having been loaded, provides the computer installation with the functionality for updating an address database in a database memory containing recorded address records, making use of the following steps:

receiving and processing address data as shown on items of post;
storing the address data;

characterised by the determination of a quality rating for the address data on the basis of predefined criteria, comparison of the address data with the address records stored in the database memory and updating the content of the database memory on the basis of the quality rating and the comparison of the address data with the stored address records.

The present invention also relates to a computer program that can be read by a computer installation and, after having been loaded, provides the computer installation with the functionality for updating an address database in a database memory containing recorded address records, making use of the following steps:

receiving and processing address data as shown on items of post;
storing the address data;

characterised by the determination of a quality rating for the address data on the basis of predefined criteria, comparison of the address data with the address records stored in the database memory and updating the content of the database memory on the basis of the quality rating and the comparison of the address data with the stored address records.

BRIEF DESCRIPTION OF THE DRAWINGS

The invention will be explained below with reference to a few figures which are intended solely to illustrate the invention and not to restrict the scope thereof.

FIG. 2 is an example of an installation that can be used when updating a database with address records;

DETAILED DESCRIPTION OF THE INVENTION

Figure 1:
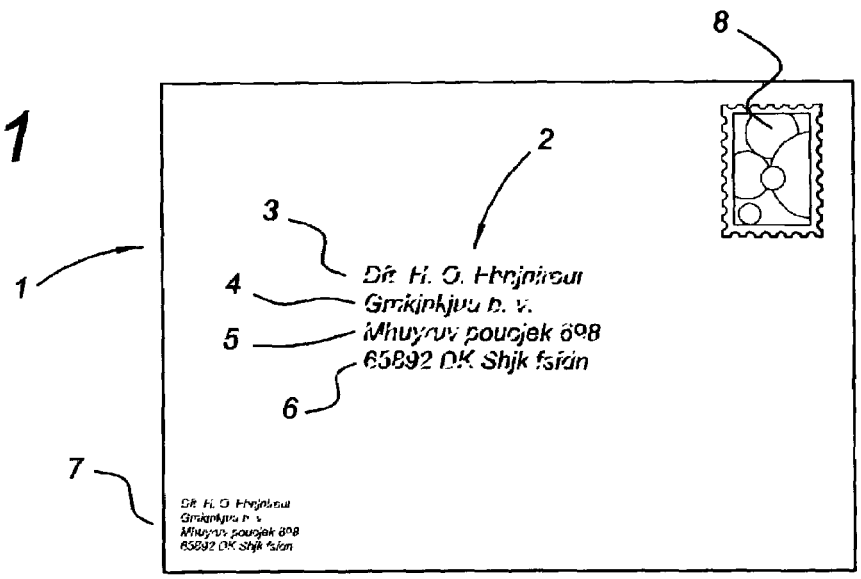
FIG. 1 is an example of an item of post that is provided with address data for an addressee and address data for a sender.

FIG. 1 shows an example of a letter which is provided with an addressee's address data 2 and a sender's address data 7. The letter 1 can have been provided with a stamp 8. Instead of a stamp 8 it is also possible for the item to have been franked by machine or the like. As a further alternative the address data can have been provided on the item of post as a supplement or exclusively in the form of a code. Such a code can be a one-dimensional or two-dimensional barcode. The franking value can also have been incorporated in such a code. In that case the code can be termed an "electronic stamp".

The addressee's address data comprise, for example, a name line 3, a company name 4, a street address 5 and a town and postcode 6. The sender's address data can be compiled in a similar manner.

Such a letter 1 can be sorted using an automatic sorting machine. An example of this is shown in FIG. 2. The letter 1 is, for example, placed on a conveyor belt 10. The conveyor belt 10 guides the letter 1 past an image scanner 12, which makes an image of that side of the item of post on which the addressee's data 2, and optionally the sender's data 7, are shown. The image scanner 12 sends the recorded image to the processor 14.

After having been scanned by the image scanner 12, the letter 1 is fed by the conveyor belt 10 to a barcode printer 26, which is able to print a barcode on the letter 1. This barcode contains further details which are used in the final sorting. After having been fed through the barcode printer 26, the letter 1 is fed by the conveyor belt 10 to a sorting machine 28, which reads the printed barcode and on the basis of this feeds the letter 1 into a specific route 30, 32, 34, 36 . . . .

The image scanner 12, the barcode printer 26 and the sorting machine 28 are connected to a processor 14. The processor 14 is also connected to means by means of which the operator can enter data, such as a mouse 18 and a keyboard 16. The processor 14 is also connected to suitable memories, including, for example, a hard disk 20 and an image memory 22, in which the processor 14 stores the image containing address data, both with regard to the addressee and with regard to the sender (if applicable), read by the image scanner 12.

The processor 14 is also connected to display means 24, for example in the form of a monitor.

The processor 14 automatically controls the image scanner 12, the barcode printer 26 and the sorting machine 28 for the sorting process. The manner in which this takes place is known per se and requires no further explanation here.

In the set-up according to FIG. 2 the processor 14 is connected to a telephone network, for example PSTN 40 (public switched telephone network).

As a supplement, an additional processor 15 can be arranged between processor 14 and the PSTN 40, which additional processor 15 is able to relieve the load on processor 14 by, for example, performing the activities with regard to the transmission and receipt of the data via the PSTN. This can include the buffering of data, the establishment of communication with other processors via the PSTN 40 and in particular the performance of one or more operations which are needed in the framework of the present invention and which are not per se already required for the sorting process itself. For example, for the sorting process it will not be necessary to derive the name of the addressee (company name and/or private individual) or the sender's data 7 from the image provided by the image scanner.

A central processor 42 is also connected to PSTN 40. The central processor 42 is also connected to a central database memory 44.

In FIG. 2 it is indicated that the processor 14 is connected (optionally via processor 15) to PSTN 40 via a cable 38 (1) and there are several such connections 38 (2), 38 (3), 38(4), . . . . These other connections are intended to indicate that several such set-ups with local processors and local sorting means can be connected to the PSTN 40. They are all able to communicate with the central processor 42 via the PSTN 40.

However, it is also conceivable that the invention is used on a local set-up and that the processor 14, optionally together with processor 15, is directly connected to the central database memory 44.

The central database memory 44 comprises a database containing address records. Within the context of this invention an address record contains at least one name line 3, a street address 5 and a town and postcode 6. The name on the name line can be the name of an individual but can also be a company name, or both. Sometimes there are two (or more) name lines on which, for example, both the name of an individual and a company name are shown. Of course, it is also possible to incorporate further relevant data in the address record.

Figure 3:
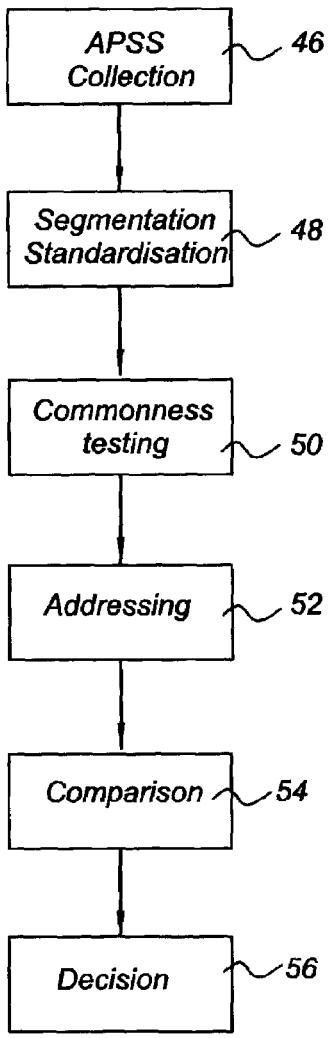
FIG. 3 is a flowchart showing a few steps during the process for updating address records in a database.

FIG. 3 shows in broad outline the steps which are taken during updating of address records in the central database memory 44. Roughly the following steps are taken in this operation.

The data on the item of post are submitted to a human and/or mechanical recognition process with the aim of obtaining data on those involved in the postal service.

The image that is stored in image memory 22 is analysed by processor 14, optionally in combination with processor 15, to establish the position of one or more address blocks relating to the addressee and optionally the sender. Each address block is subjected to analyses in which the nature of the lines in the address block is assessed. Each line in the address block is segmented, that is to say an assessment is made of the logically coherent elements from which the line is made up, for example 'initials', or 'street address'. Optionally the content of elements found is standardised, various occurrences being displayed in a standard format.

Each assessment that is made in the recognition process results in an assessment score in which the degree of (un)certainty regarding the recognition result is shown. A poor recognition result may give rise to rejection of the detected result as unusable. In the recognition process use can be made of available verified reference data, in which context consideration can be given to files containing surnames, postcodes, street addresses, towns and collection points found in a specific country, for example The Netherlands. Such reference data are stored in a memory and can be used for a finer assessment of the recognition and possibly even for correction of previous recognition results. For instance, a postcode which is recognised but does not exist can possibly be improved after matching with the verified file of postcodes that do exist.

FIG. 3 will now be explained in more detail.

Currently approximately 24 million items of post a day are automatically processed in The Netherlands by means of an automatic post sorting system (APSS) in six different sorting centres. In terms of functionality, one such sorting centre corresponds to the mid section in FIG. 2. The image scanner 12 makes a digital image of the address side of each item of post 1, which image is sent to the processor 14, which stores the image in image memory 22. The address in the digital image is localised by the processor 14 and the address is then read automatically. In a first step in the flowchart in FIG. 3, "APSS collection" 46, the address data on the items of post are temporarily stored locally in an image memory 22. The characters present in the address data in the image are established with the aid of optical character recognition (OCR) techniques, which are known per se. A character recognition reliability rating can be determined for conversion of the characters present on the items of post to digital characters, which character recognition reliability rating depends on the accuracy of the character on the item of post, the read process by the image scanner 12 and the quality of the OCR process. Handwritten characters will give a greater likelihood of an incorrect result than printed characters.

Preferably, only those address data which have been machine-written on the item of post 1 and for which the postcode/house number combination 6 has been read correctly are used for updating the address data in the central database 44. For the post sorting process itself, as far as possible all data resulting from the OCR process, including those for handwritten addresses, will, of course, be taken into account. The address data on post with handwritten addresses are preferably considered to be insufficiently reliable for updating the address database in the central database memory 44.

To supplement address data which have been derived from recorded images with the aid of OCR techniques, use can be made of data input manually by people. The data concerned here are, for example, data on items of post for which the processor 14 has established that it is impossible automatically to derive existing address data in respect of street address, postcode and town from the characters in the image. Such items of post are rejected during the sorting process and put on one side for manual processing. An employee processes these items of post by hand in as much as he/she reads the address on the image via the monitor 24 and, via the input means 16, 18, manually enters the address which he/she has established, after which the processor 14 is still able to send the correct instructions to the barcode printer 26 and the sorting machine. It is furthermore conceivable that said employee reads the address data on the original item of post 1 him/herself. It is also conceivable that address data for updating the central database 44 originating from items of post have been entered manually elsewhere, resulting in a data file containing address data which, for example, are is by floppy disk or via the Internet and is submitted to the central processor 42 after it has been read.

The central processor 42 is able to communicate via the network connection PSTN 40 (or via any other suitable communication link) with processor 14 (or 15) in order to request the images stored in the image memory 22. After receipt, the central processor 42 can add any administrative data required to the address data scanned. Administrative data consists, for example, of the sorting centre where the address data were scanned, the date the address data were scanned and a serial number. The central processor 42 is then able to store the scanned address data, which have been received, centrally in any suitable memory. This can be, for example, a memory that is separate from the central database memory 44.

Figure 4:
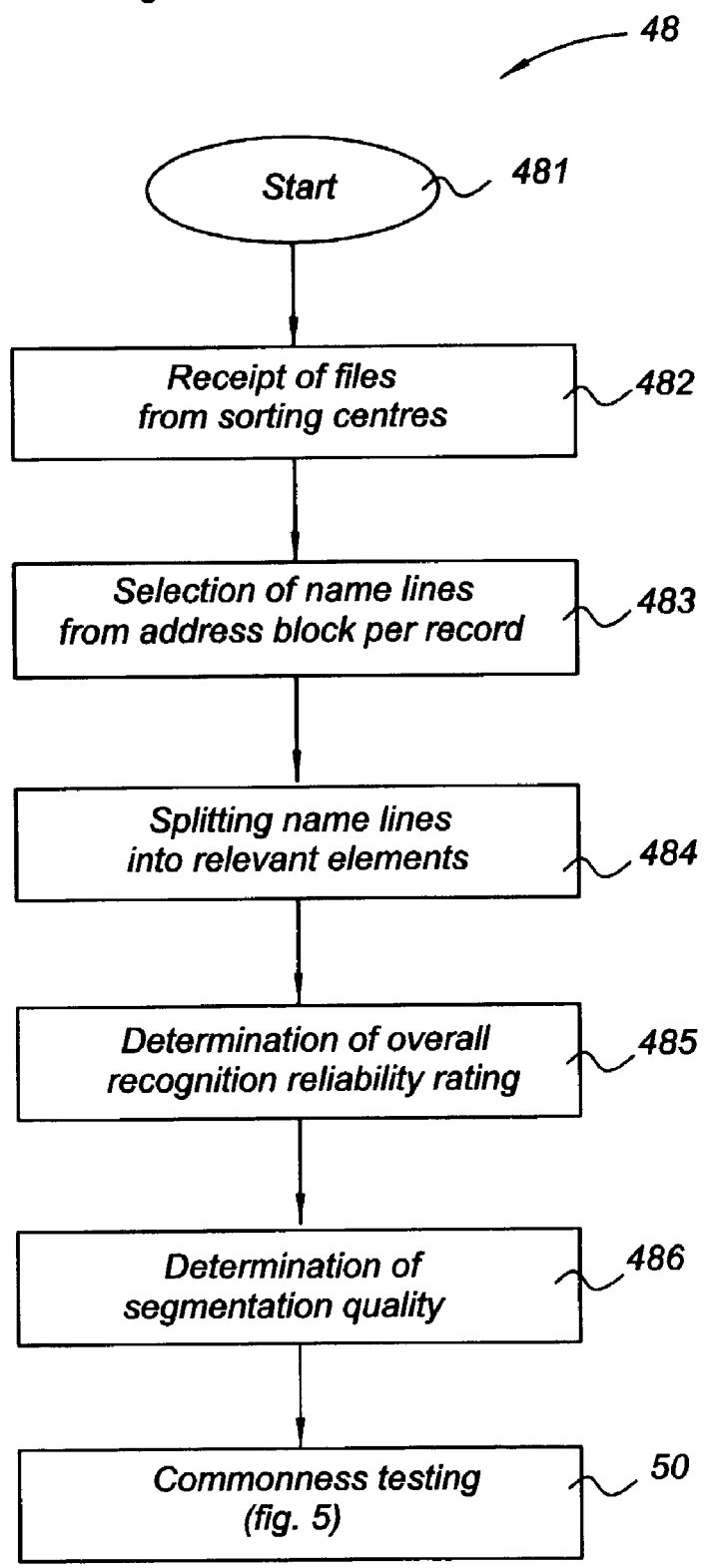
FIGS. 4, 5 and 6 give further details of a few of the steps shown in FIG. 3.

After the "APSS collection step" 46 a segmentation/standardisation step 48 is carried out. As shown in FIG. 4, in this step the address data that have been scanned and called up (step 482) are split into relevant elements for each item of post. Name lines 3 are selected from the addressee's address data 2, step 483, and split into elements, step 484. Meanings, such as prefix, first name, title, etc. are assigned to the individual elements. The individual elements can then be standardised, various occurrences being displayed in a standard format. If present, the company name 4 is also analysed. An address record containing surnames and/or company names and associated attributes, such as initials, infixes, suffixes, etc., then results.

In accordance with a predefined algorithm, an overall recognition reliability rating is determined from the data in the address record, step 485. The character recognition reliability rating is incorporated as an element in this overall recognition reliability rating. The overall recognition reliability rating also takes account of any writing errors and/or typing errors in the address data on the item of post itself.

A rating for the quality of the segmentation (splitting into individual elements) within the segmentation process is also determined, step 486. Both the overall recognition reliability rating and the segmentation quality are incorporated in the address record. Both ratings, that is to say overall recognition reliability rating and segmentation quality, are subsequently used when actually updating the address records in the central database memory 44.

Figure 5:
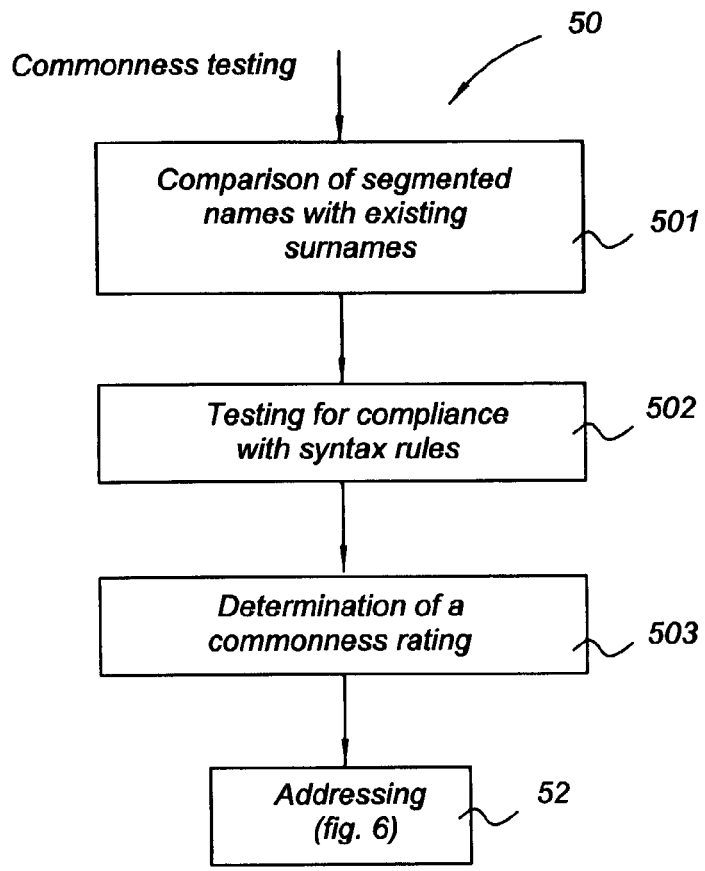
Figure 6:
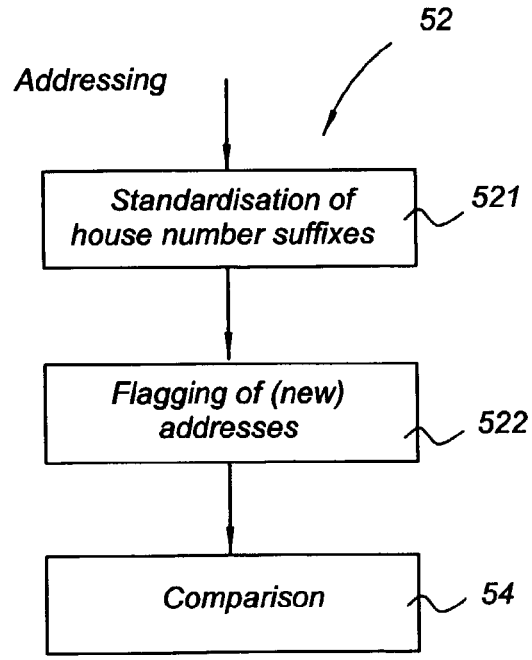

Commonness 50 is then carried out by the central processor 42 (see FIG. 5). To this end the central processor 42 has a file of surnames occurring in The Netherlands. This file is stored in a memory (not shown) connected to the central processor 42. Each surname that has been split off from the address data with the aid of step 48 is compared with existing surnames in step 501 and is tested for conformity to syntax rules in step 502. The same operation is carried out with first names and any company names present. With the aid of a predefined algorithm, a commonness rating for each surname, first name and any company name is determined and is added to the address record, step 503.

The street address data 5 (or P.O. Box numbers) and the combination of postcode and town 6 are checked by the processor 14 as soon as they have been displayed with the aid of image scanner 12 to determine whether they exist, because these data are needed for the post sorting process. In current practice house number suffixes, such as "top", "back", "second floor", "II", etc., are not checked. In step 52 "addressing" these house number suffixes are standardised with the aid of a list of frequently occurring abbreviations. For example, "TO" ("opp") is synonymous with "tegenover" ("opposite"). "1-hoog" ("first floor") is, for example, synonymous with "1$^e$" ("1$^{st}$") and with "i".

In step 52 the central processor 42 checks whether there are corresponding data in the database stored in the central database memory 44 for each combination of street or road name, number, postcode and town. If this is not the case, the address displayed is "new". This fact is added to the address record scanned (step 522).

The central processor 42 then reads from the central database in the central database memory 44 all names recorded in the address (including suffixes) in an address record that has been scanned. The names 3, 4 scanned are compared with the names recorded in the central database. If possible any initials, first names, prefixes, surnames and suffixes are compared with one another. Each name 3, 4 scanned for an addressee is assigned a comparison score in which the quality and the results of comparisons with the various components of the recorded name, that is to say initials, prefixes, first name, surname, suffixes, etc., are incorporated.

On the basis of the comparison scores, the segmentation quality, the commonness rating and the overall recognition reliability rating for the address data scanned, the central processor 42 decides whether an address record scanned is new, known or unknown. For this operation use is made of a quality rating which preferably is based on at least one of the following criteria: segmentation quality, the commonness rating and the overall recognition reliability rating. The quality rating can be, for example, the arithmetic mean of these three criteria together. The assignment of the status "new", "known" or "unkown" can, for example, take place in accordance with the following rules:

the address data scanned are new if the comparison scores are relatively low and the quality rating is relatively high;

the address data scanned are known if the comparison scores are relatively high and the quality rating is relatively high;

the address data scanned are unknown if the comparison scores are relatively low and the quality rating is relatively low.

The assignment of this status takes place in step 56 "decision".

The statistics for known address records are updated in the same step. This will be discussed in more detail below.

The central processor 42 can generate a new address record in the central database memory 44 for a new and/or unknown address record.

The following steps can, for example, be taken for updating statistical data relating to address records already known.

The frequency with which a data element occurs can be recorded per sorting centre, so that the spread of an address element can be determined. It is also possible to record the date on which an address record was last read in one of the sorting centres. In this way it is possible to record in the central database the dates in, for example, the past year, on which a particular address record occurred somewhere on an item of post. The interval between two successive times that the address record was used on an item of post can then be determined. In order to determine this interval it is possible, for example, to check a recent period or a period in the more distant past. It is also possible to determine the average length of time between two successive times that the address record was read in one of the sorting centres. If the average period changes substantially in the course of time this can be an indication that the address record has to be amended.

It is also possible that the sender's address data 7 are recorded and stored in a memory. The sender's data 7 can then be used when determining the value of the quality rating. After all, it can be assumed that items of post which originate from, for example, a local authority's registry office contain very reliable addressee address data 2. Preferably, destination addresses which originate from the database 44 itself are not used to determine the degree of reliability of addresses in the database 44.

If the senders' address data are stored it is also possible to record whether an address element is frequently despatched from the same address. If a destination address is frequently used from only one sender's address, the reliability does not have to be high. The more senders' addresses that use the same destination address the greater will be the reliability.

On the basis of the data each address record can be assigned a status, for example new, common, reliable or old. For this purpose the following rules can, for example, apply. When an address record is compiled for the first time it is given the status new. An address record becomes common when it is received several times from different senders and/or from different sorting centres. A common address record can be reliable if the address record is encountered regularly on items of post. The regularity is determined on the basis of the average interval between two successive times that the address record is read on an item of post. It can be determined that a reliable address record reverts to common if the average duration of said interval becomes longer than a predefined period. If an address record is no longer encountered it acquires the status old.

If the interval between recent times that an address record is encountered on an item of post becomes increasingly long this is an indication that, for example, the addressee has moved and it can be decided that the address record should lapse.

EXAMPLE

An example of a recognition process will now be explained. It is presumed that only data where a valid postcode has been read are submitted. The address block read is, for example:

BTT Port Redapersice
Pohtnus 5838
5858 GJ Riksdijk NL whilst the following appears on the item of post 1 that has been read:

PTT Post Mediaservice
Postbus 5858
5858 GJ Rijswijk NL

Each character has been read with a certain recognition reliability and an average recognition reliability rating can thus be determined for each line. This is, for example, 60% for the first line, 75% for the second line and, for example, 65% for the last line. The overall recognition reliability rating could then be the average of 60%, 75% and 65%=66.6%. As an alternative the first line could also be said to be decisive when determining the recognition reliability.

In this case segmentation leads to three lines. Three words are differentiated in the first line, two words in the second line and again two words, plus a separate attribute, in the third line. Assuming a postcode and town in the third line of the address, the third line is given a low segmentation score, if only because of the large space between two elements (Riksdijk and NL), of, for example, 40%. The second line ought to contain road or street name and number (and optionally a suffix) and is given a high segmentation score since the structure corresponds to that expected; for example 90%. The first line contains three elements of three, four and eleven characters and thus has a good structure for a surname or a company name. The segmentation score is, for example, 80%. An average segmentation score is 70%.

No known prefixes, infixes or suffixes are encountered in the name line, nor are any titles or anything similar. This indicates that a company name is involved here. In the second line a check is made to establish whether there is a suffix to the house number and if so what this is. In this example there is no suffix and it will be recognised that what is concerned here is a P.O. Box. There is thus little to standardise.

Commonness testing could consist in matching with existing personal or company names. Matching will yield a certain score. The score is 100% in the case of complete correspondence and the score is 0% if completely different. Comparison with the name "PTT Post Mediaservice" could, for example, yield a score of 65%, whilst the results of comparison with "PTT Post Brieven" is 25% and with Sijthof Pers is 0%.

The comparison score can be calculated via a matching algorithm, but then by comparison with names of individuals and/or companies registered at the address read (Postbus 5858). The latter could be, for example, the following companies: PTT Post Mediaservice, DMdata and Dataprofs. The match with PTT Post Mediaservice is 65% and that with DMdata and Dataprofs is 0%. The comparison score with PTT Post Mediaservice is obviously the highest.

A rule-based system will now determine whether in the present case (66.6% reliability, 70% segmentation, 65% commonness, 65% comparison score) the data element must be qualified as known, unknown or new. The requirement for a new data element can be, for example, that a quality rating (for example the average of overall recognition reliability rating, segmentation and commonness) is greater than 80% and that the comparison score is lower than 80%. The requirement for a known data element can be, for example, that the quality rating and the comparison score are higher than 95%. Everything that falls outside this can be qualified as unknown.

Further Embodiments

FIG. 2 shows the situation where the central database memory has one database. However, it is also possible on the basis of the database in the central database memory to make an additional database that contains a selection of the address records from the complete central database. This selection takes place on the basis of specific decision rules. For example, only those address records for which the reliability is in excess of a specific threshold value are incorporated in this selection of address records. These reliable address records can then, for example, be made available for use by third parties.

In the case where an additional database containing a selection of the data from the central database memory is provided, there can be a provision that, as an additional decision rule for inclusion in the additional database memory, selection must be in accordance with the relevant regulations under privacy legislation. In order to store data in accordance with privacy legislation the central database itself can be incorporated in a black box. The data stored therein can then be accessed only via secure output routines, for example likewise incorporated in the black box. In this context it is possible, for example, to provide for the use of an, optionally public, electronic key.

Thus, in the decision-making process with regard to the usability of an address data element that has been scanned, use is preferably made of (1) the frequency of the occurrence thereof, (2) the variation therein and (3) the spread with regard to senders. In principle, a rule-based system can be set up for this purpose. As an alternative, the central processor 42 can be provided with a neural network or the like. In general it will be the case that an address data element is the better usable the more recently it has been read on an item of post, if it occurs sufficiently frequently (is common), the greater the number of different senders from which it is received (common) and the higher the quality thereof, for example indicated by the segmentation quality and the recognition reliability rating.

An embodiment in which the steps for updating the central database are carried out by the central processor 42 has been described above. As previously mentioned, these steps can, however, also be carried out by the processor 14 (or, optionally, partially by processor 15), specifically when the database to be updated is an address database which exists solely locally and which is stored in a memory that is connected to the processor 14 (or 15).

Additional possibilities for the installation and method described are as follows.

The sender's address data 7 can be scanned when the image scanner 12 is used for display. The processor 14 can, for example, establish that the sender's address data 7 correspond to those for PTT POST (or the sorting office) itself. The data originating from the latter will correspond to the data in the central database memory 44. Such data are preferably not incorporated in the image memory 22 in order to prevent possible errors in the central database memory 44 confirming themselves every time.

Job titles of people are sometimes specified on items of post in addition to titles and the like for names in name lines 3. These data can also be stored in the central database memory 44. These job titles can be of importance when compiling the said additional database.

Of course, the central database 44 can also be used during the sorting process that has been explained above.

The invention claimed is:

1. Installation for updating an address database with recorded address records, comprising:
    at least one processor (14, 15, 42) for receiving and processing address data as shown on items of post;
    a memory (22), connected to the at least one processor (14, 15, 42), for storing the address data; and
    a database memory (44), connected to the at least one processor (14, 15, 42), containing the address database stored therein, wherein,
    the at least one processor (14, 15, 42) is equipped
    i) to determine a quality rating for the address data as scanned from an item of post on the basis of predefined criteria, the quality rating indicating how good the address data are,
    ii) to derive a name for an addressee from the name lines, to derive an address for the addressee from the address data, to read registered names of persons residing at that address from the address database and to compare these with the name of the addressee and, on the basis of that comparison, to determine a comparison score per registered name, the comparison score having a higher value the greater the degree of correspondence between the name of the addressee and a respective registered name, the comparison score being derived apart from the quality rating,
    iii) to update statistical data relating to said address records stored in said database memory (44), and
    iv) to update the content of the database memory (44) on the basis of a rule-based system taking into account the quality rating, the comparison score, and said statistical data.

2. Installation according to claim 1, wherein said statistical data includes at least one of the group comprising:
    frequency with which an address record occurs per sorting centre;
    dates on which an address record occurred on an item of post;
    interval between two successive times that an address record was used on an item of post;
    average of length of time between two successive times that an address record was used on an item of post; and
    sender's address data in relation to the address records.

3. Installation according to claim 1, wherein the at least one processor is equipped to determine a reliability rating for recognition of the address data and partly to base the quality rating on the reliability rating for recognition.

4. Installation according to claim 1, wherein the at least one processor is equipped to select name lines from the address data, to split the name lines into individual elements in accordance with predefined rules and partly to base the quality rating on the selection of name lines and the splitting thereof.

5. Installation according to claim 4, further comprising:
    stored common names, and
    wherein the at least one processor is equipped to compare the individual elements of the name lines with the common names, to establish a commonness rating on the basis thereof and partly to base the quality rating on the commonness rating.

6. Installation according to claim 1, wherein the at least one processor is equipped to determine that the address data are new if the comparison scores are relatively low and the quality rating is relatively high.

7. Installation according to claim 6, wherein the at least one processor is equipped to generate an additional address record, containing the address data, in the address database if the address data are new.

8. Installation according to claim 7, wherein the at least one processor is equipped to record one of the following four statuses per address record:
    status new, if the address record is generated;
    status common, if the associated address data are received from different senders;
    status reliable, if the associated address data are regularly read afresh; and
    status old, if the address record lapses.

9. Installation according to claim 1, wherein the at least one processor is equipped to determine that the address data are known if the comparison scores are relatively high and the quality rating is relatively high.

10. Installation according to claim 1, wherein the at least one processor is equipped to determine that the address data are unknown if the comparison scores are relatively low and the quality rating is relatively low.

11. Installation according to claim 1, wherein the address database is stored with security, such that either the data stored in the central database can be processed only via predefined rules or some of the data stored in the central database can be accessed via a secure output routine.

12. Installation according to claim 1, further comprising post sorting units (26, 28) for automatic sorting of the items of post (1) making use of the address database.

13. The computer storage medium according to claim 1, wherein said statistical data includes at least one of the group comprising:
- frequency with which an address record occurs per sorting centre;
- dates on which an address record occurred on an item of post;
- interval between two successive times that an address record was used on an item of post;
- average of length of time between two successive times that an address record was used on an item of post; and
- sender's address data in relation to the address records.

14. Method for updating an address database in a database memory (44) containing recorded address records, comprising the steps of:
- determining a quality rating for the address data as scanned from an item of post on the basis of predefined criteria, the quality rating indicating how good the address data are;
- deriving a name for an addressee from the name lines, derive an address for the addressee from the address data, reading registered names of persons residing at that address from the address database and comparing these with the name of the addressee and, on the basis of that comparison, determining a comparison score per registered name, a comparison score having a higher value the greater the degree of correspondence between the name of the addressee and a respective registered name, the comparison score being derived apart from the quality rating;
- updating statistical data relating to said address records stored in said database memory (44); and
- updating the content of the database memory (44) on the basis of a rule-based system taking into account the quality rating, the comparison score, and said statistical data.

15. Method according to claim 14, wherein said statistical data includes at least one of the group comprising:
- frequency with which an address record occurs per sorting centre;
- dates on which an address record occurred on an item of post;
- interval between two successive times that an address record was used on an item of post; and
- average of length of time between two successive times that an address record was used on an item of post;
- sender's address data in relation to the address records.

16. Method according to claim 14, comprising the further step of determining a reliability rating for recognition of the address data and partly basing the quality rating on the reliability rating for recognition.

17. Method according to claim 14, comprising the further steps of:
- selecting name lines from the address data;
- splitting the name lines into individual elements in accordance with predefined rules; and
- partly basing the quality rating on the selection of name lines and the splitting thereof.

18. Method according to claim 17, comprising the further steps of:
- comparing the individual elements of the name lines with common names; and
- establishing a commonness rating on the basis thereof; and
- partly basing the quality rating on the commonness rating.

19. Method according to claim 14, comprising the further step of determining the address data are new if the comparison scores are relatively low and the quality rating is relatively high.

20. Method according to claim 19, comprising the further step of generating an additional address record, containing the address data, in the address database if the address data are new.

21. Method according to claim 20, comprising the step of recording one of the following four statuses per address record:
- status new, if the address record is generated;
- status common, if the associated address data are received from different senders;
- status reliable, if the associated address data are regularly read afresh; and
- status old, if the address record lapses.

22. Method according to claim 14, comprising the further step of determining that the address data are known if the comparison scores are relatively high and the quality rating is relatively high.

23. Method according to claim 14, comprising the further step of determining that the address data are unknown if the comparison scores are relatively low and the quality rating is relatively low.

24. Method according to claim 14, wherein the address database is stored with security such that either the data stored in the central database can be processed only via predefined rules or some of the data stored in the central database can be accessed via a secure output routine.

25. Method according to claim 14, comprising the further step of sorting items of post (1) making use of the address database.

26. A computer-readable storage medium encoded with a computer program of instructions executable executed by a computer to control the computer to execute a method of updating an address database in a database memory (44) containing recorded address records, the method making use of the following steps:
- determining a quality rating for the address data as scanned from an item of post on the basis of predefined criteria, the quality rating indicating how good the address data are;
- deriving a name for an addressee from the name lines, derive an address for the addressee from the address data, reading registered names of persons residing at that address from the address database and comparing these with the name of the addressee and, on the basis of that comparison, determining a comparison score per registered name, a comparison score having a higher value the greater the degree of correspondence between the name of the addressee and a respective registered name, the comparison score being derived apart from the quality rating;
- updating statistical data relating to said address records stored in said database memory (44); and
- updating the content of the database memory (44) on the basis of a rule-based system taking into account the quality rating, the comparison score, and said statistical data.

27. The computer-readable storage medium according to claim 26, wherein said statistical data includes at least one of the group comprising:
frequency with which an address record occurs per sorting centre;
dates on which an address record occurred on an item of post;
interval between two successive times that an address record was used on an item of post;
average of length of time between two successive times that an address record was used on an item of post; and
sender's address data in relation to the address records.

28. A computer storage medium storing a program product for a computer to perform, and executed by a processor of the computer, a method of updating an address database in a database memory (44) containing recorded address records, the method making use of the following steps:
determining a quality rating for the address data as scanned from an item of post on the basis of predefined criteria, the quality rating indicating how good the address data are;
deriving a name for an addressee from the name lines, derive an address for the addressee from the address data, reading registered names of persons residing at that address from the address database and comparing these with the name of the addressee and, on the basis of that comparison, determining a comparison score per registered name, a comparison score having a higher value the greater the degree of correspondence between the name of the addressee and a respective registered name, the comparison score being derived apart from the quality rating;

updating statistical data relating to said address records stored in said database memory (44); and updating the content of the database memory (44) on the basis of a rule-based system taking into account the quality rating, the comparison score, and said statistical data.

\* \* \* \* \*